United States Patent [19]

Muhlberger

[11] Patent Number: 4,815,410
[45] Date of Patent: Mar. 28, 1989

[54] CURVED WINDSHIELD MOUNTING SYSTEM

[75] Inventor: Frederick J. Muhlberger, Gloversville, N.Y.

[73] Assignee: Nelson A. Taylor Co., Inc., Gloversville, N.Y.

[21] Appl. No.: 185,998

[22] Filed: Apr. 25, 1988

Related U.S. Application Data

[62] Division of Ser. No. 8,666, Jan. 30, 1987, Pat. No. 4,750,449.

[51] Int. Cl.⁴ .............................................. B63B 17/00
[52] U.S. Cl. ................................... 114/361; 296/96.21
[58] Field of Search ............ 114/343, 361; 296/84 A, 296/84 D, 84 R, 93; D12/182; 52/208, 211, 397, 400

[56] References Cited

U.S. PATENT DOCUMENTS

| | | | |
|---|---|---|---|
| 3,016,548 | 1/1962 | Taylor | 114/361 |
| 3,021,535 | 2/1962 | Dorst | 114/361 |
| 3,654,648 | 4/1972 | Wilhoit | 114/361 |
| 3,810,267 | 5/1974 | Fussel, Jr. et al. | 114/361 |

Primary Examiner—Joseph F. Peters, Jr.
Assistant Examiner—Edwin L. Swinehart
Attorney, Agent, or Firm—Nixon & Vanderhye

[57] ABSTRACT

The mount includes an elongated extrusion of aluminum having upper, intermediate and lower portions connected one to the other. The upper portion has a generally channel-shaped cross-section for receiving an edge of the curved windshield. The intermediate portion extends along one side of the member and connects to the lower portion. The lower portion is arcuate in cross-section, terminating in a free end spaced from the upper portion along the opposite side of the member. Indicia is provided along the inside of the arcuate portion for locating openings for receiving screws to secure the mounting member to a boat deck. The compound curvature of the windshield glass is accommodated while maintaining continuous flush line contact between the mount and the deck.

9 Claims, 2 Drawing Sheets

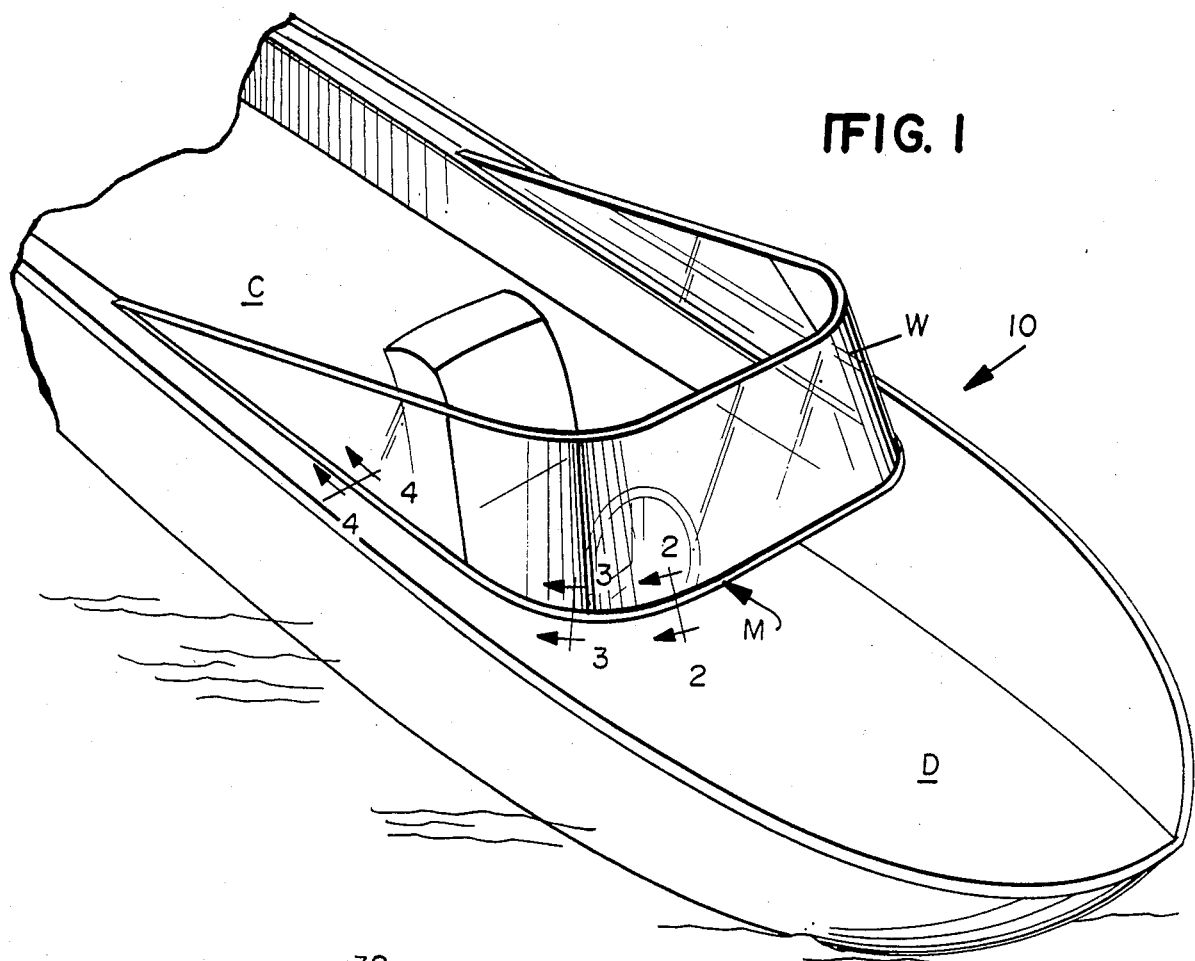
FIG. 1
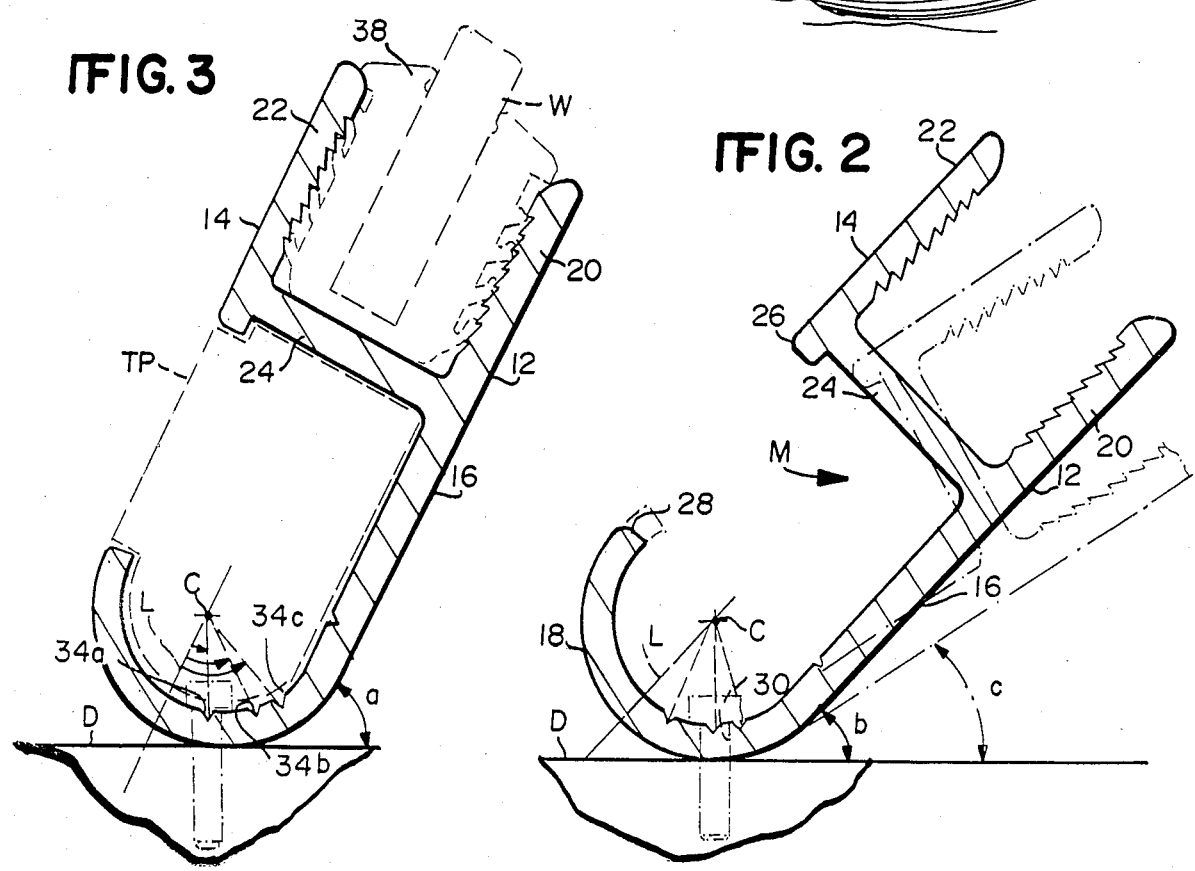
FIG. 3
FIG. 2

CURVED WINDSHIELD MOUNTING SYSTEM

This application is a Divisional of U.S. Ser. No. 008,666, Jan. 30, 1987, now U.S. Pat. No. 4,750,449.

BACKGROUND OF THE PRESENT INVENTION

The present invention relates to apparatus and methods for mounting a curved sheet element on a surface and particularly relates to apparatus and methods for mounting a curved windshield on the deck of a boat.

Systems for mounting curved sheet elements to a surface, particularly mounting curved windshields to the deck of a boat, are known. One such mounting system includes an elongated member having upper, intermediate and lower portions wherein the upper portion comprises, in cross-section, a generally channel-shaped receptacle for receiving the lower edge of the curved windshield. The lower portion includes a flat which extends from the intermediate portion at an angle of approximately 45° relative to the base of the channel-shaped upper portion. The intermediate portion includes angularly related portions connected along one edge intermediate of and to the base of the channel while the other angularly related portion extends rearwardly for connection with the flat. The forward portion of the flat terminates in a free edge defining with the base of the channel, the intermediate portion and the inside surface of the flat a receptacle for receiving a trim piece.

In using that mounting system, it is necessary to bend the elongated member to conform it to the curvature of the lower edge of the glass. In bending the member, however, twisting also occurs, causing the flat to stand up from the deck. That is, the flat will not maintain a flush continuous contact with the deck over the full length of the member. Additionally, the mounting member is secured to the deck by screws disposed through the flat. The compound curvature of the mounting member, however, makes it extremely difficult to mount the screws and secure the mounting member and windshield to the deck. Even after such securement, gaps appear between the mounting member and the deck.

SUMMARY OF THE PRESENT INVENTION

According to the present invention, there is provided a system for mounting a curved sheet element on a surface, particularly for mounting a curved windshield on a boat deck. The system provides a continuous flush contact between the mounting member and the boat deck surface throughout the entire length of the mounting member while simultaneously facilitating mounting of the windshield to the deck. To accomplish this, and in accordance with the present invention, there is provided an elongated member having upper and lower portions connected one to the other by an intermediate portion. The upper portion is preferably generally channel-shaped in cross-section for receiving the lower edge of the curved sheet element. Other cross-sectional shapes may be used, however, provided only that the curved lower edge of the windshield may be secured to the upper portion of the mounting member. The intermediate portion extends along one side of the member and from the channel-shaped upper portion toward the lower portion. In contrast to the above-discussed mount, the lower portion of the mounting member of the present invention is arcuate in cross-section with the arcuate section connected along one side to the intermediate portion and extending in a direction generally toward the opposite side of the member. The arcuate section opens toward the channel-shaped upper portion.

It will be appreciated that, in the case of a curved glass windshield for a boat, the curvature of the windshield necessitates different angles of inclination between the windshield and deck at various locations along the windshield. For example, the angle between the windshield and the deck at the forwardmost portion of the windshield may be about 30°–35°. At the sides of the windshield adjacent the corners and the locations of greatest curvature, such angle may be 75°–80°. In bending and twisting the mounting member of the present invention to accommodate the compound curvature of the windshield along its lowermost edge, it will be seen that the arcuate lower portion of the mounting member permits continuous flush contact without gaps between the mounting member and the flat deck throughout the length of the member as it curves from the front of the windshield around its corners to the sides of the windshield. That is, an edge or line contact between the arcuate section of the mounting member and the deck is maintained. Because of the compound curvature of the mounting member, however, such contact is at different arcuate or circumferential positions along the arcuate lower portion of the member.

To further facilitate the mounting of the windshield to the deck, indicia is provided at positions along the inside concave surface of the lower arcuate portion indicative of selected various angles of inclination of the windshield relative to the deck. For example, scribe lines may be formed along the concave surface of the lower portion at arcuately-spaced positions. These scribe lines preferably extend the full length of the mounting member and, for example, may be spaced 20°, 45° and 55° from the vertical. The scribe lines therefore indicate the location of or provide a guide for locating fastening openings in the member which, in turn, is dependent upon the intended angle of the windshield relative to the boat deck at such location. For example, at the forwardmost portion of the windshield where the windshield inclines rearwardly to a larger extent than at the corners, one or the other or both of the 45° or 55° scribe lines may be used as guides for punching fastener openings through the lower portion of the mount at that longitudinal location along the mounting member. Conversely, for the corners and sides where the windshield is disposed at a steeper angle relative to the deck, the 20° scribe line may be used as a guide for punching the fastening openings at that longitudinal location along the mounting member. Preferably, these fastener holes are formed through the mount prior to installation of the glass but after the mount has been bent to the proper configuration to receive the lower edge of the glass. Consequently, the fastening openings can be preformed and located in accordance with the angle of inclination of the windshield relative to the boat deck such that the line of contact between the lower arcuate portion of the mounting member and the flat deck will pass through the centerline of the preformed openings at each longitudinal location of the openings along the mounting member.

As in the previously described mounting system, the mounting member of the present invention provides an elongated recess between the base of the channel-shaped upper portion and the lower portion for receiving a trim piece, a projection being formed from the base of the channel-shaped upper portion to retain the trim piece in the recess.

Accordingly, it is a primary object of the present invention to provide a novel and improved system for mounting a sheet element to a surface and particularly a system for mounting a curved windshield to a boat deck wherein the compound curvature is accommodated by a mounting member which, when bent to receive the windshield, provides continuous flush contact without gaps with the boat deck throughout the longitudinal extent of the mounting system.

These and further objects and advantages of the present invention will become more apparent upon reference to the following detailed description, claims and appended drawings wherein:

BRIEF DESCRIPTION OF THE DRAWINGS

FIG. 1 is a fragmentary perspective view of the cockpit of a boat illustrating a mounting system for a curved windshield constructed in accordance with the present invention;

FIGS. 2, 3 and 4 are enlarged cross-sectional views of the mounting member taken about on lines 2—2, 3—3 and 4—4 in FIG. 1, respectively.

DETAILED DESCRIPTION OF THE DRAWINGS

Figure 4:
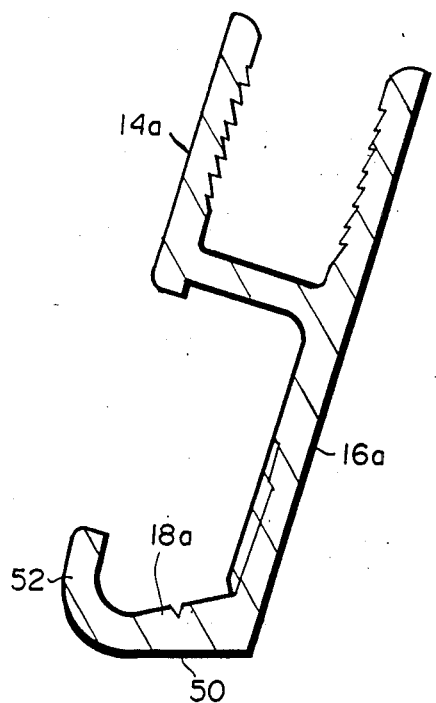

Reference will now be made in detail to a preferred embodiment of the present invention, an example of which is illustrated in the accompanying drawings.

In FIG. 1, there is illustrated a boat, generally designated 10, having a cockpit C partially enclosed adjacent its forward end by a curved windshield W. The windshield W is conventionally formed of tempered safety glass. It will be appreciated from a review of FIG. 1, in conjunction with FIGS. 2 and 3, that the windshield forms different angles with the flat deck D of the boat at various longitudinal locations along the windshield. For example, as illustrated by the dashed lines in FIG. 2, the forwardmost portion of the windshield along the centerline of the boat may lie at a relatively flat angle relative to the deck, and, in certain installations, may make an angle "c" of 35°-40° with the deck. In contrast, the angle of inclination formed by the curved windshield and the deck adjacent the corners of the windshield W, as best illustrated by the full lines in FIGS. 2 and 3, is much steeper, as indicated at "b" and "a", respectively. Angles "b" and "a" may be on the order of 45° and 70°, respectively. Thus, the mounting member must be able to accommodate the bending and twisting necessary to mount the lower curved edge of the windshield glass. It will also be appreciated that it is highly desirable to form the mounting member of unitary construction to facilitate continuous flush sealing contact with the deck. In accordance with the present invention, these conflicting criteria are accommodated by providing a mounting member M having a particular cross-sectional configuration which achieves those purposes.

Turning now particularly to FIGS. 2 and 3, the mounting member M of the present invention is comprised of an elongated member 12, preferably constituted by an extrusion of aluminum, which may be subsequently bent and twisted to receive the lower curved edge of the windshield W in a manner described hereinafter. More particularly, member 12 includes an upper portion 14, an intermediate portion 16 and a lower portion 18. Upper portion 14 is generally channel-shaped having opposed side walls 20 and 22, respectively, and a base 24. The inside facing surfaces of the sides 20 and 22 are serrated to improve the retention characteristics of the mounting member with respect to the windshield in a manner described hereinafter. Also, for purposes discussed hereinafter, an elongated rib 26 projects below the forward edge of the upper portion 14 and constitutes an extension of the front side 22 below base 24.

As illustrated in FIG. 2, intermediate portion 16 extends along the rear side of mounting member M. Preferably, intermediate portion 16 constitutes a linear continuation of side 20.

Lower portion 18 is preferably arcuate in cross-section and which arcuate cross-section constitutes a continuation of intermediate portion 16. That is, arcuate section 18 extends along one side from intermediate section 16 in a generally arcuate, preferably concave, configuration toward the opposite side of the mounting member. While the preferred concave lower portion hereof constitutes a semi-circular section, it will be appreciated that other lower portions having non-circular arcuate cross-sections may be used. It will also be appreciated from a review of FIGS. 2 and 3 that the concave portion extends from the intermediate portion 16 toward the opposite side of the mounting member terminating in a free edge 28 spaced from and below rib 26. Thus, the concave portion opens toward the channel-shaped upper portion 14 and lies along the circumference of a circle having its center C between the upper and lower portions 14 and 18, respectively.

Means are provided in the lower portion 18 for securing the member 12 to the deck of the boat and those means include a plurality of openings spaced longitudinally one from the other along and through the arcuate lower portion 18. However, a review of FIGS. 2 and 3 demonstrates that the contact between the member 12 and the flat deck D is essentially a line contact between the arcuate portion and the deck but at different arcuate positions along arcuate portion 18 depending upon the relative angular relation of windshield W (and hence member 12) and deck D. Because of this difference in angularity and the need to secure member 12 flush to the deck, the fastener openings 30 are disposed through arcuate portion 18 at different circumferential positions therealong at spaced locations along the longitudinal extent of member 12 depending upon the designed angularity of the windshield W and member 12 relative to the deck at each longitudinal location along the member 12. Preferably, the holes are punched through the arcuate portion after member 12 has been bent and twisted to accommodate the lower curved edge of the glass but prior to installation of the glass.

To facilitate the punching of the openings 30 at the proper locations along the arcuate portion 18 of member 12, indicia is provided along the inside surface of the arcuate portion. This indicia serves as a guide for locating the openings depending upon the angularity of member 12 and glass W relative to deck D at each longitudinal location of an opening. In a preferred form hereof, a series of arcuately spaced elongated scribe lines 34a, 34b, 34c, etc., may be formed, generally parallel one another, along the inside surface of arcuate portion 18, preferably in the course of forming the member 12. For example, scribe lines 34a, 34b and 34c may be provided on member 12 in the extrusion process at locations 20°, 45° and 55° rearwardly from the vertical L of the member 12 through the center C, thereby indicating the locations of openings 30 along the arcuate portion for inclinations of member 12 relative to the vertical of 70°, 45° and 35°, respectively. In the example illustrated by the dashed lines in FIG. 2, where the angle "c" between the windshield and deck is 35°, the opening at that longitudinal location along member 12 would be formed through the arcuate section at scribe line 34c, which represents 55° from the vertical. In the full line position of the member 12 shown in FIG. 3 where the angle "b" between the windshield and deck is 45°, the opening at that longitudinal location along member 12 would be formed through scribe line 34b. With respect to member 12 as illustrated in FIG. 3 where the inclination is about 20°, the opening at that longitudinal location would be through scribe line 34a.

Figure 5:
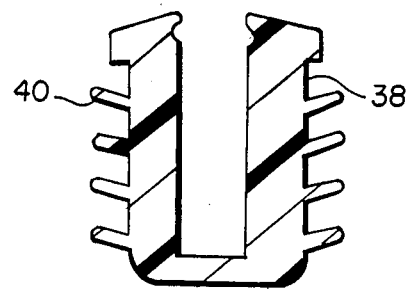
FIG. 5 is a view similar to FIG. 2 illustrating a mounting member specifically configured for mounting the wings.

To install the windshield mounting system of the present invention, the straight aluminum extrusion is first bent and twisted to accommodate the curvature of the lower edge of the windshield W. Indicia 34a–34c are then used to locate the fastener openings at the appropriate arcuate positions along the arcuate portion of member 12, the openings being formed by punching through the arcuate portion at those positions. A liner 38, preferably channel-shaped as illustrated in FIG. 5, is inserted into the channel-shaped upper portion 14. Linear 38 is preferably formed of extruded vinyl and has longitudinally-extending outwardly projecting ribs 40 for cooperation with the serrations formed on the inside surfaces of sides 20 and 22 to facilitate retention of the liner and hence windshield in the channel-shaped upper portion 14 of member 12. An adhesive is preferably also used to secure the vinyl to member 12, for example, a cyano acrylate adhesive may be used for this purpose. The lower edge of the curved windshield may then be inserted into the channel-shaped upper portion 12 and specifically within liner 38. An adhesive, for example an acrylic, is also used to secure the liner 38 to the glass.

With the glass mounted on member 12, the system may be readily and easily installed on the deck of the boat inasmuch as the fastener openings lie essentially flush along the boat deck along the intended line of contact between the member 12 and boat deck D. The fasteners, i.e., screws, are then readily inserted through the openings and the windshield assembly secured to the boat deck without any gaps being formed between the arcuate portion and deck. Caulking may thereafter be applied as desired between the lower portion 18 of the member 12 and the boat deck. Additionally, a trim piece TP, indicated by the dashed lines in FIG. 3, may be inserted in the space defined by base 24, intermediate portion 16 and arcuate portion 18. Preferably, the trim piece is formed of a compressible rubber which can be compressed for disposition in that space and retained therein by the rib 26 and free edge 28 of the lower portion.

While the present windshield mounting system has been illustrated with respect to a one-piece windshield system, wherein the member 12 and windshield extends from one side of the boat cockpit to the opposite side, it will be appreciated that the system is equally applicable to two-piece windshield systems, as well as to three-piece systems that include hinged or fixed center panels.

As illustrated in FIG. 1, side or wing panels of glass are also provided, essentially as discrete continuations of the curved windshield glass. The mounting member 12 of the present invention may likewise be utilized to secure the wing panels to the deck at the desired relatively constant inclination of the wing panel relative to the deck throughout the full length of the wing panels. Alternatively, the mounting member illustrated in FIG. 4 may be used. Here, like reference numerals as in the preceding embodiment are applied to like parts followed by the letter "a". In this form, the upper and intermediate portions 14a and 16a, respectively, are identical to the corresponding portions of the previous embodiment. In this form, however, the lower portion 18a includes a flat 50 extending from the intermediate portion 16a, preferably at an angle of about 18° to the horizontal. Thus, for a wing inclined 18° relative to the vertical throughout its length, the flat 50 may lie flush against the boat deck. For steeper angles, the outer arcuate portion 52 may be provided with securing openings, similarly as described in connection with the previous embodiment, to maintain a continuous line contact between the deck and the windshield mount.

It will thus be seen that according to the present invention, apparatus and methods for mounting a curved sheet element to a surface, particularly a curved windshield to a flat boat deck, have been provided wherein flush continuous contact between the mounting member and the deck is provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent mounting systems and methods of making the mounting systems.

I claim:

1. Apparatus for mounting a curved windshield on a surface comprising:

an elongated member having generally coextensive upper and lower portions connected one to the other and having front and back sides;

means for securing a curved margin of the windshield to the upper portion;

said lower portion having a generally convex outer surface extending generally between said front and back sides of the member and facing in a direction away from said upper portion;

securing means for securing the member to the surface and including means defining a plurality of openings spaced one from the other along the length of said lower member and opening through said convex outer surface thereof;

means providing for access to said securing means from one of said front and back sides of said member.

2. Apparatus according to claim 1 in combination with a boat and said curved windshield wherein the surface comprises the deck of a boat, the elongated member having a curvature corresponding to the curvature of an edge of said windshield and angles of inclination to the boat deck corresponding to those of said windshield at like longitudinal positions along said member, said opening means are spaced one from the other arcuately along the convex surface of said lower portion in accordance with the angle between said curved windshield and said deck and a plurality of fasteners extending through said openings for securing said windshield to said deck whereby continuous flat contact is maintained between said deck and said convex surface of said member at various arcuate locations therealong depending upon said angle.

3. Apparatus according to claim 1 wherein said member has an elongated retaining element coextensive therewith, projecting to said one side of said member and spaced above said lower portion to define therewith a space for receiving a trim piece and means carried by said lower portion and said retaining element for retaining the trim piece with the space.

4. Apparatus according to claim 1 wherein said elongated member is curved in its lengthwise direction for substantial conformance with the curved margin of the windshield.

5. Apparatus according to claim 1 wherein the windshield is adapted to extend at different angles of inclination relative to the surface at different locations along the curved margin of the windshield, said member being twisted such that said said upper portion extends at a different angle of inclination at different longitudinal locations therealong for receiving the curved margin of the windshield at locations having substantially corresponding angles of inclination of the windshield relative to the surface.

6. Apparatus according to claim 4 wherein the windshield is adapted to extend at different angles of inclination relative to the surface at different locations along the curved margin of the windshield, said member being twisted such that said upper portion extends at a different angle of inclination at different longitudinal locations therealong for receiving the curved margin of the windshield at locations having substantially corresponding angles of inclination of the windshield relative to the surface.

7. Apparatus according to claim 1 wherein said openings are spaced at different arcuate locations along said lower portion.

8. Apparatus according to claim 4 wherein said openings are spaced at different arcuate locations along said lower convex surface.

9. Apparatus according to claim 6 wherein said openings are spaced at different arcuate locations along said lower convex surface.

* * * * *